United States Patent
Liu et al.

(10) Patent No.: US 12,023,750 B2
(45) Date of Patent: Jul. 2, 2024

(54) MULTI-CHANNEL ELECTROCHEMICAL MACHINING DEVICE AND METHOD FOR BLISK

(71) Applicant: Nanjing University of Aeronautics and Astronautics, Jiangsu (CN)

(72) Inventors: Jia Liu, Nanjing (CN); Shuanglu Duan, Nanjing (CN); Di Zhu, Nanjing (CN)

(73) Assignee: Nanjing University of Aeronautics and Astronautics, Jiangsu (CN)

( * ) Notice: Subject to any disclaimer, the term of this patent is extended or adjusted under 35 U.S.C. 154(b) by 0 days.

(21) Appl. No.: 18/138,610

(22) Filed: Apr. 24, 2023

(65) Prior Publication Data

US 2023/0339031 A1 Oct. 26, 2023

(51) Int. Cl.
| | |
|---|---|
| *B23H 3/04* | (2006.01) |
| *B23H 3/10* | (2006.01) |
| *B23H 9/10* | (2006.01) |
| *B23H 11/00* | (2006.01) |

(52) U.S. Cl.
CPC ............... *B23H 3/04* (2013.01); *B23H 3/10* (2013.01); *B23H 9/10* (2013.01); *B23H 11/003* (2013.01)

(58) Field of Classification Search
CPC ............... B23H 3/04; B23H 3/10; B23H 9/10
See application file for complete search history.

(56) References Cited

U.S. PATENT DOCUMENTS

2022/0355405 A1* 11/2022 Huttner ............... B23H 3/04

OTHER PUBLICATIONS

CN 112975012 A—see translation (Year: 2021).*

* cited by examiner

*Primary Examiner* — Nicholas A Smith
(74) *Attorney, Agent, or Firm* — Howard & Howard Attorneys PLLC

(57) ABSTRACT

Disclosed are a multi-channel electrochemical machining device and method for a blisk, and relate to the technical field of blisk electrochemical machining. The multi-channel electrochemical machining device for a blisk comprises an electrolytic bath used for accommodating an electrolyte, a blisk workpiece, a tube electrode and a top cover plate. The top cover plate is located above the blisk workpiece. An electrolysis chamber used for the tube electrode to electrolyze the blisk workpiece is formed between the lower surface of the top cover plate and the surface of the blisk workpiece. The electrolysis chamber communicates with the electrolytic bath. A drainage seam communicating the electrolysis chamber and the electrolytic bath along the axial direction of the blisk workpiece is formed in the upper surface of the top cover plate.

10 Claims, 4 Drawing Sheets

MULTI-CHANNEL ELECTROCHEMICAL MACHINING DEVICE AND METHOD FOR BLISK

CROSS-REFERENCE TO RELATED APPLICATION

This patent application claims the benefit and priority of Chinese Patent Application No. 202210436337.1, filed with the China National Intellectual Property Administration on Apr. 25, 2022, the disclosure of which is incorporated by reference herein in its entirety as part of the present application.

TECHNICAL FIELD

The present disclosure relates to the technical field of electrochemical machining of blisks, in particular to a multi-channel electrochemical machining device and method for a blisk.

BACKGROUND

The blisk, as the core component of an aero-engine, is twisted and complex in blade profile, narrow in channel and high in machining accuracy. The blisk is usually made of difficult-to-machine materials such as superalloy, titanium alloy or a titanium-aluminum intermetallic compound, so the blisk manufacturing technology has always been one of the major problems in the manufacturing field.

Electrochemical machining is a special process method for reducing metal materials by using the principle of electrochemical anodic dissolution. The method has the characteristics of high machining efficiency, no loss of tools, no stress in machining, wide range of machinable materials and the like. With these outstanding characteristics, electrochemical machining has the outstanding principle advantages in the field of blisk manufacturing, and has become one of the mainstream machining technologies of aero-engine blisks.

Pre-machining of cascade channels is an essential stage in electrochemical machining of blisks, and is also the fine machining basis of blade profiles. At this stage, most of the materials are removed, and the machining accuracy can directly affect the subsequent surface fine machining. Electrochemical machining of tube electrodes is one of effective methods for pre-machining cascade channels. Usually, a hollow circular tube electrode with one closed end is used to move relative to the blisk blank according to a set motion track. An electrolyte sprays into the machining gap from the electrolyte outlet gap of the side wall of the tube electrode, so that the twisted cascade contour can be formed. The method not only exerts the outstanding principle advantages of electrochemical machining, but also absorbs the characteristics of programmable and flexible numerical control technology. The method is suitable for machining the cascade channels with blisks of various shapes.

Because of the unique machining mode of tube electrode electrochemical machining, by designing a special synchronous feeding movement device, a plurality of tube electrodes can be fed at the same time and move along the same movement track, and finally a plurality of cascade channels can be machined at one time, which will be of great significance to improve the machining efficiency of the blisk. In the patent "integral impeller multi-channel electrochemical machining device", the tube electrodes deflect at the same time through a "crank rocker mechanism". In the patent "cone hub blisk multi-cascade electrolysis device and method based on voltage regulation", a tube electrode synchronous eccentric rotation and swing mechanism based on gear transmission is designed. These patents all provide the design schemes of multi-electrode synchronous feed devices. However, for machining of the multiple tube electrodes, with the increase of the number of tube electrodes, undoubtedly, the design difficulty of the electrolyte flow field is increased. In addition, in the machining process of the above patents, the tube electrodes move in a three-dimensional space. Under the influence of the electrolyte forward rush phenomenon in the tube electrodes, there is more electrolyte near the end of the tube electrode and less electrolyte in the area close to the outer edge of the blisk workpiece, which leads to an electrolyte deficient area locally at the outer edge of the blisk workpiece and affects the normal electrolysis process.

Therefore, in the electrochemical machining process of the multiple tube electrodes, it is urgent to design a multi-electrode synchronous feed movement device, at the same time, reduce the electrolyte deficient area and simplify the steady flow sealing tooling.

SUMMARY

The purpose of the present disclosure is to provide a multi-channel electrochemical machining device and method for a blisk, so as to solve the problems existing in the prior art. The electrolyte in the electrolytic bath can supplement the electrolyte deficient area in time, so that the possibility of the formation of the electrolyte deficient area is reduced, and the electrolysis process can be carried out normally.

In order to achieve the above purpose, the present disclosure provides the following scheme. The present disclosure provides a multi-channel electrochemical machining device for a blisk, including an electrolytic bath used for accommodating an electrolyte, a blisk workpiece, a tube electrode and a top cover plate, wherein the blisk workpiece is connected to the positive electrode of a power supply, and the tube electrode is connected to the negative electrode of the power supply. The blisk workpiece, the tube electrode and the top cover plate are all located in the electrolytic bath. The top cover plate is located above the blisk workpiece. An electrolysis chamber used for the tube electrode to electrolyze the blisk workpiece is formed between the lower surface of the top cover plate and the surface of the blisk workpiece. In the radial direction of the blisk workpiece, the electrolysis chamber communicates with the electrolytic bath. A drainage seam communicating the electrolysis chamber and the electrolytic bath along the axial direction of the blisk workpiece is formed in the upper surface of the top cover plate. An electrolyte outlet is formed in the tube wall of the tube electrode. The tube electrode can move along the blade profile of the finished blisk relative to the blisk workpiece.

Preferably, the electrochemical machining device also comprises a worktable. The worktable is provided with a first lifting mechanism. The lifting end of the first lifting mechanism is fixedly provided with a first rotating mechanism. The bottom of the rotating shaft of the first rotating mechanism is fixed with the blisk workpiece.

Preferably, the blisk workpiece is fixed on the rotating shaft of the first rotating mechanism through a fixture base. The fixture base is located at the bottom of the blisk workpiece. An accommodating groove used for accommodating the tube electrode is formed in the upper surface of the fixture base along the radial direction.

Preferably, the worktable is also provided with a second lifting mechanism. The lifting end of the second lifting mechanism is fixed on the top cover plate.

Preferably, an outer ring rotating ring sleeves the outer part of the electrolytic bath. The outer ring rotating ring is connected with a second rotating mechanism which drives the outer ring rotating ring to rotate. A first electrode support and a second electrode support can be rotationally arranged on the outer ring rotating ring and the electrolytic bath, respectively. An electrolyte outlet pipe can slide along axial direction of the pipe and penetrate through the first electrode support. The tube electrode is arranged on the second electrode support and communicates with the electrolyte outlet pipe.

Preferably, gear teeth are arranged on the outer wall of the outer ring rotating ring. The second rotating mechanism includes a gear meshed with the gear teeth and a servo motor which is fixed on the worktable and in transmission connection with the gear.

Preferably, the first electrode support and the second electrode support are both of insulation structures.

Preferably, a plurality of tube electrodes are arranged along the circumferential direction of the electrolytic bath. A plurality of electrolyte outlet pipes communicate with an electrolyte storage tank used for storing the electrolyte through an electrolyte shunt device.

Preferably, a drainage pipe is arranged at the bottom of the electrolytic bath. An overflow pipe is also arranged inside the electrolytic bath. The drainage pipe and the overflow pipe both communicate with the electrolyte storage tank.

The present disclosure also provides a multi-channel electrochemical machining method for a blisk, including the following steps:

firstly, mounting the blisk workpiece and the fixture base on the first rotating mechanism;

secondly, enabling the servo motor to rotate, and driving the outer ring rotating ring to rotate by the gear, so that the tube electrode is located in the gap between the blisk workpiece and the side wall of the electrolytic bath;

thirdly, driving the blisk workpiece to descend by the first lifting mechanism, when the upper surface of the blisk workpiece descends below the tube electrode, enabling the first lifting mechanism to stop descending and the servo motor to reverse, so that the tube electrode is located above the blisk workpiece;

fourthly, driving the blisk workpiece to ascend by the first lifting mechanism, so that the blisk workpiece stops after making contact with the tube electrode, and then driving the blisk workpiece to descend at a set distance by the first lifting mechanism;

fifthly, driving the top cover plate to descend by the second lifting mechanism, so that the bottom of the top cover plate is in contact with the top of the blisk workpiece, and the tube electrode is correspondingly located in a strip groove;

sixthly, opening an electrolyte inlet valve between the electrolyte shunt device and the electrolyte storage tank to start electrolyte incoming;

seventhly, after electrolyte incoming is completed, enabling the blisk workpiece and the electrolyte outlet pipe to be connected with the positive electrode and negative electrode of the power supply, while the first lifting mechanism drives the blisk workpiece to ascend, driving the blisk workpiece to rotate by the first rotating mechanism, and driving the outer ring rotating ring to rotate by the second rotating mechanism until a group of cascade channels are completed; and eighthly, reversing the first lifting mechanism, the first rotating mechanism and the second rotating mechanism, so that the electrolyte outlet pipe returns to the upper part of the blisk workpiece, then rotating the blisk workpiece, and repeating the above steps to complete all the cascade passages.

Compared with the prior art, the present disclosure has the following technical effects.

Firstly, in the device, the blisk workpiece is integrally placed in the electrolyte in the electrolytic bath, so that the electrolyte in the electrolytic bath can supplement the electrolyte deficient area in time, the possibility of forming the electrolyte deficient area is reduced, and the electrolysis process can be carried out normally.

Secondly, the drainage seam is formed in the top of the electrolysis chamber, so that the electrolyte supplementing effect of the electrolyte in the electrolytic bath on the electrolyte deficient area can be promoted, and the electrolyte deficient area is further prevented.

Thirdly, through the rotation of the outer ring rotating ring, the tube electrodes can be driven to deflect at the same time, so that the cascade channels can be completed by one-time electrochemical machining, and the machining efficiency is higher.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Reference signs: 1, electrolytic bath; 2, blisk workpiece; 3, tube electrode; 4, top cover plate; 5, electrolysis chamber; 6, drainage seam; 7, first lifting mechanism; 8, first rotating mechanism; 9, fixture base; 10, second lifting mechanism; 11, outer ring rotating ring; 121, gear; 122, servo motor; 13, first electrode support; 14, second electrode support; 15, electrolyte storage tank; 16, drainage pipe; 17, overflow pipe; 18, electrolyte shunt device; 19, electrolyte inlet valve; 20, drainage valve; 21, power supply; 22, worktable; 23, gear tooth; 24, electrolyte outlet pipe.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The purpose of the present disclosure is to provide a multi-channel electrochemical machining device and method for a blisk, so as to solve the problems existing in the prior art. The electrolyte in the electrolytic bath can supplement the electrolyte deficient area in time, so that the possibility of the formation of the electrolyte deficient area is reduced, and the electrolysis process can be carried out normally.

To make the foregoing objective, features and advantages of the present disclosure clearer and more comprehensible, the present disclosure is further described in detail below with reference to the attached figures and specific embodiments.

Embodiment I

Figure 1:
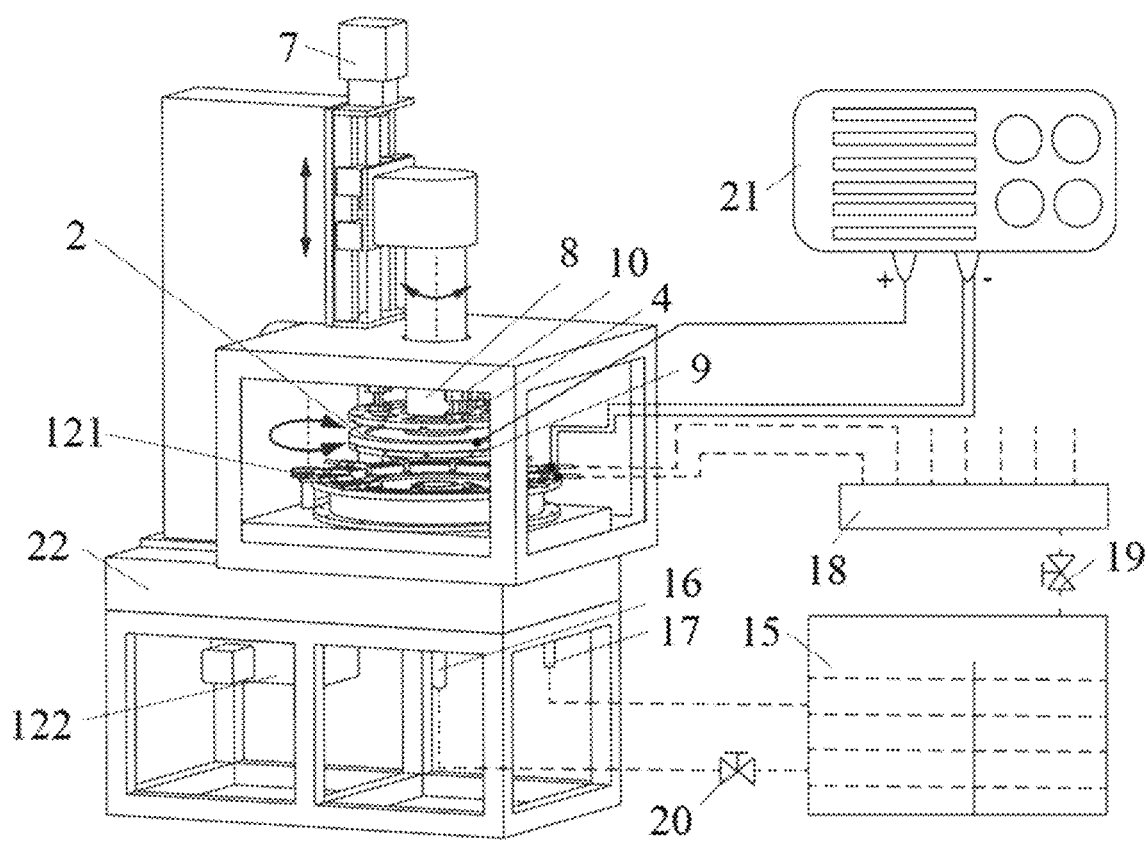
FIG. 1 is an integral structural schematic diagram of a multi-channel electrochemical machining device for a blisk in the present disclosure.
Figure 2:
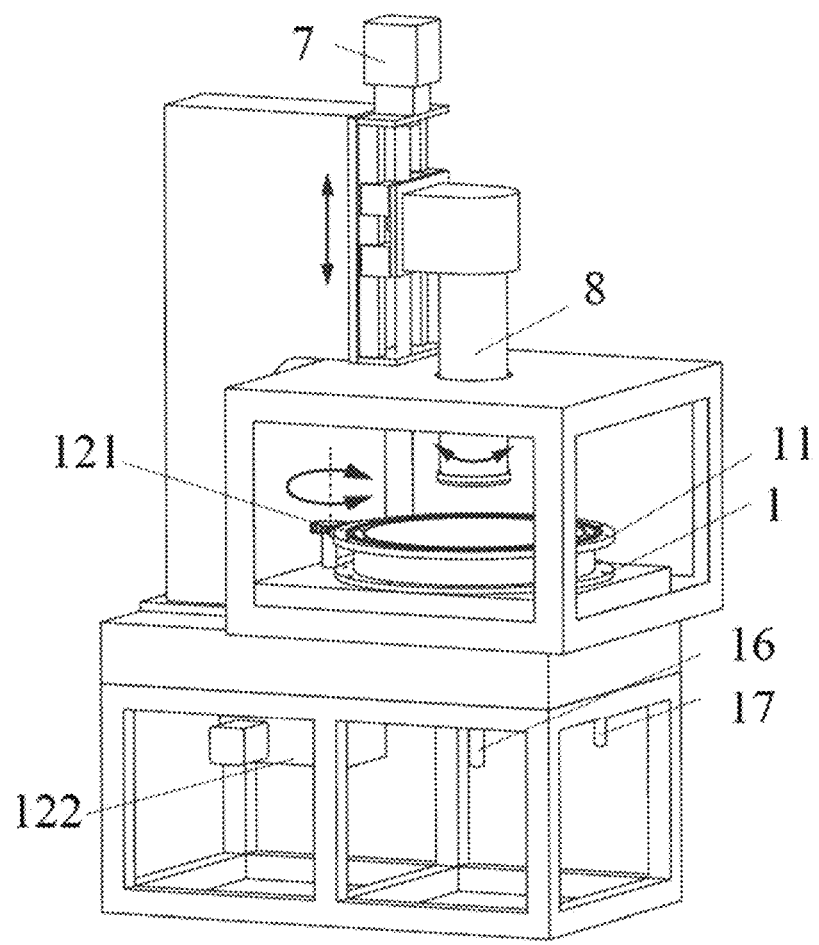
FIG. 2 is a partial structural schematic diagram of a multi-channel electrochemical machining device.
Figure 3:
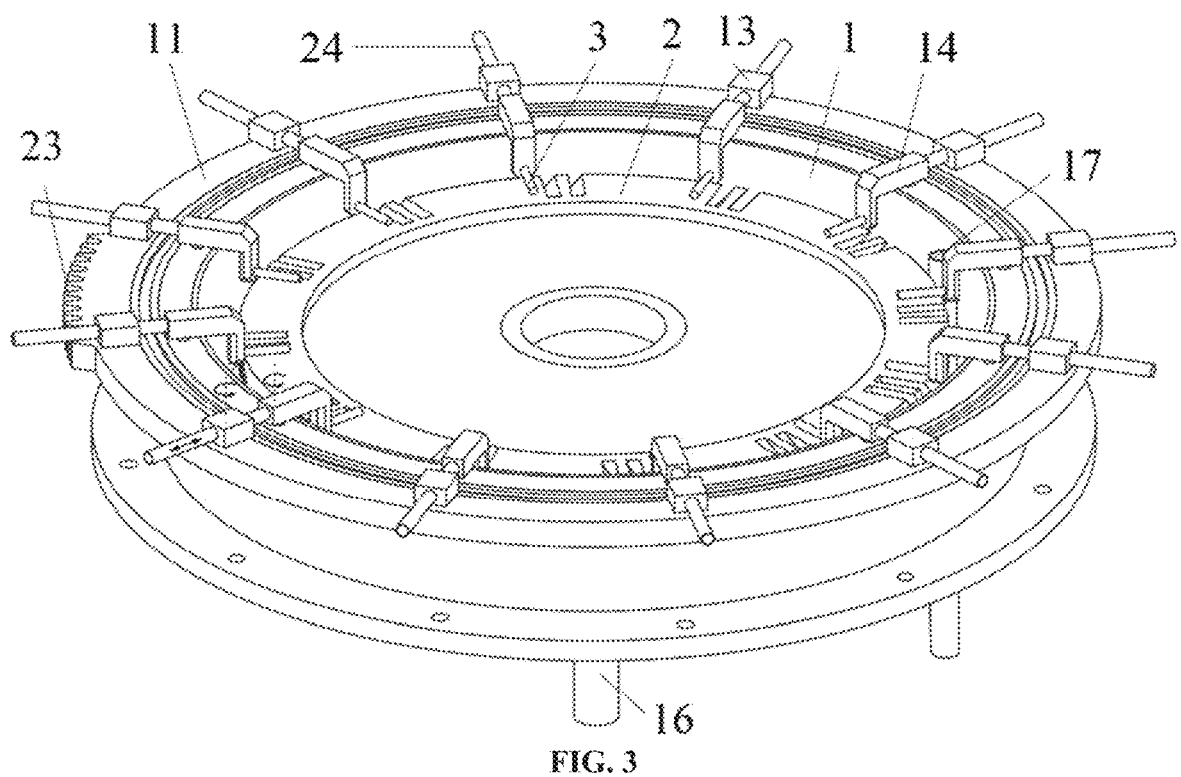
FIG. 3 is a structural schematic diagram of a blisk workpiece in an electrolytic bath.
Figure 4:
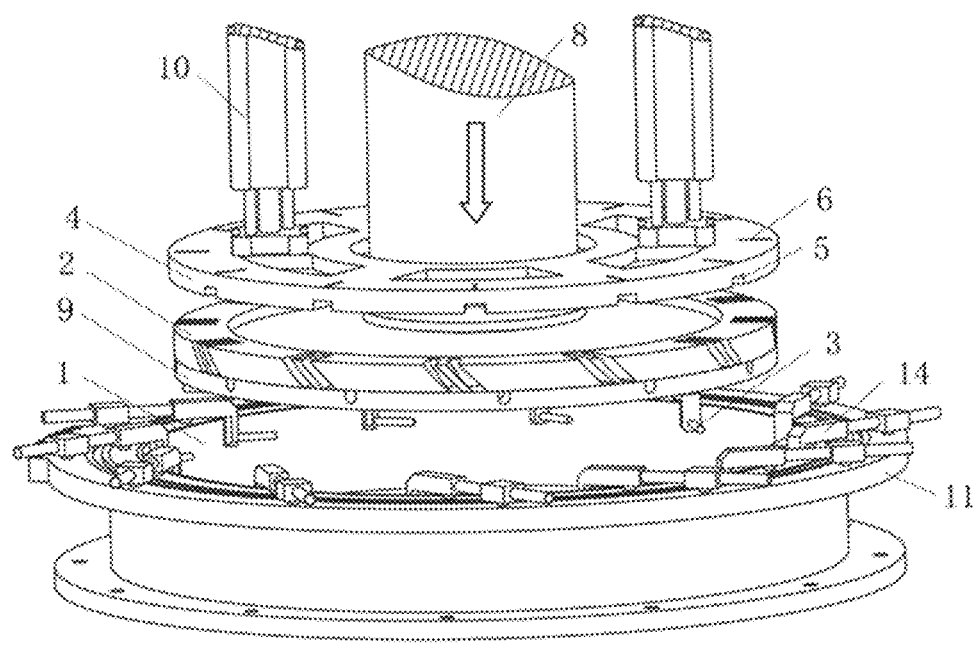
FIG. 4 is a state diagram before electrochemical machining.
Figure 5:
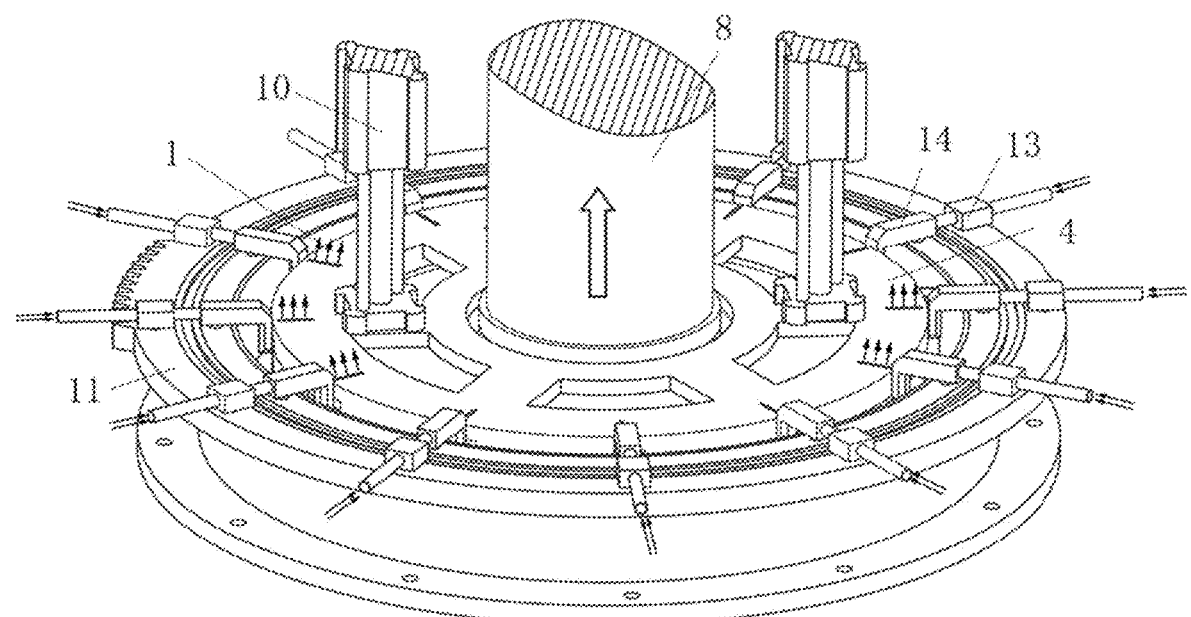
FIG. 5 is a state diagram in the electrochemical machining process.
Figure 6:
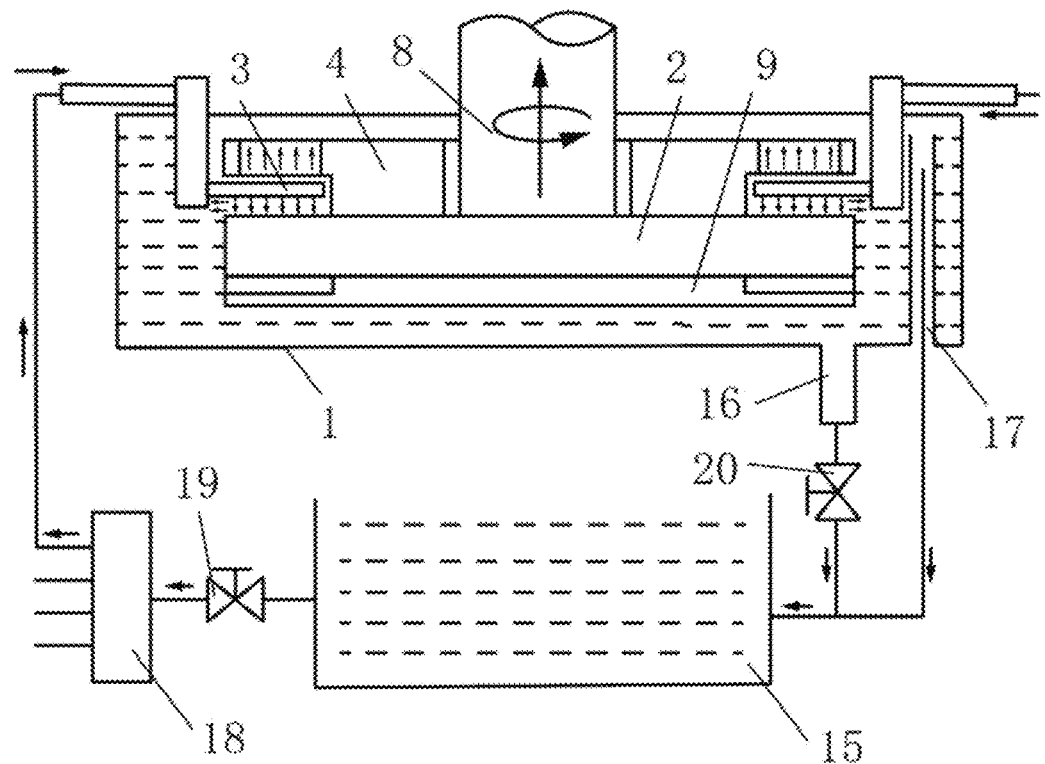
FIG. 6 is a schematic diagram of a electrolyte circulation system.

As shown in FIG. 1 to FIG. 6, the embodiment discloses a multi-channel electrochemical machining device for a blisk, including an electrolytic bath 1 used for accommodating an electrolyte, a blisk workpiece 2, a tube electrode 3 and a top cover plate 4, wherein the blisk workpiece 2 is connected to the positive electrode of a power supply 21, and the tube electrode 3 is connected to the negative electrode of the power supply 21. The blisk workpiece 2, the tube electrode 3 and the top cover plate 4 are all located in the electrolytic bath 1. The top cover plate 4 is located above the blisk workpiece 2. An electrolysis chamber 5 used for the tube electrode 3 to electrolyze the blisk workpiece 2 is formed between the lower surface of the top cover plate 4 and the surface of the blisk workpiece 2. In the radial direction of the blisk workpiece 2, the electrolysis chamber 5 communicates with the electrolytic bath 1. A drainage seam 6 communicating the electrolysis chamber 5 and the electrolytic bath 1 along the axial direction of the blisk workpiece 2 is formed in the upper surface of the top cover plate 4. An electrolyte outlet is formed in the tube wall of the tube electrode 3. The tube electrode 3 can move along the blade profile of the finished blisk relative to the blisk workpiece 2.

In the electrochemical machining process, the top cover plate 4 is pressed against the top of the blisk workpiece 2. The blisk workpiece 2 and the top cover plate 4 are completely immersed with the electrolyte in the electrolytic bath 1. The tube electrode 3 is located in an electrolysis chamber 5. The electrolysis chamber 5 is generally enclosed by a strip groove formed in the bottom of the top cover plate 4 and the upper surface of the blisk workpiece 2. An opening is formed in the end of the strip groove, so that the electrolysis chamber 5 can communicate with the electrolytic bath 1. Preferably, the diameter of the top cover plate 4 is the same as that of the blisk workpiece 2, and the length of the electrolysis chamber 5 is not less than that of the machining area of the electrolysis chamber 5. By arranging the electrolysis chamber 5, a certain back pressure always exists in the electrolytic process to ensure the electrolytic effect. When electrolysis is carried out, the tube electrode 3 ejects the electrolyte downwards, and the blisk workpiece 2 of the positive electrode is gradually electrolyzed. Because the tube electrode 3 is horizontally arranged in the electrolysis chamber 5, the electrolyte outlet is opened downwards, resulting in the influence of the forward impact phenomenon when the electrolyte is ejected, and resulting in more electrolyte at the inner end of the electrolysis chamber 5 (the end of the tube electrode 3) and less electrolyte at the outer end of the electrolysis chamber 5 (the outer edge of the blisk workpiece 2). The electrolyte deficient area is formed at the outer end of the electrolysis chamber 5. However, in the embodiment, the blisk workpiece 2 is integrally arranged in the electrolyte of the electrolytic bath 1, so that the electrolyte in the electrolytic bath 1 can supplement the electrolyte deficient area in time, the possibility of forming the electrolyte deficient area is reduced, and the electrolysis process can be carried out normally. At the same time, when the tube electrode 3 ejects the electrolyte downwards, under the action of pressure, the electrolyte can recoil upwards, and this part of the electrolyte flows out from the drainage seam 6 on the top. The top electrolyte outlet mode can reduce the electrolyte on the side surface of the electrolysis chamber 5. If all the electrolyte flows out from the side surface (namely the notch of the strip groove), the electrolyte deficient area cannot be well supplemented by the external electrolyte. Therefore, the drainage seam 6 is formed in the top of the electrolysis chamber 5 in the embodiment, so that the electrolyte supplementing effect of the electrolyte in the electrolytic bath to the electrolyte deficient area can be promoted, and the electrolyte deficient area is further prevented.

In the embodiment, the electrochemical machining device also includes a worktable 22. The electrolytic bath 1 is fixed on the worktable 22. The worktable 22 is provided with a first lifting mechanism 7. The lifting end of the first lifting mechanism 7 is fixedly provided with a first rotating mechanism 8. The bottom of the rotating shaft of the first rotating mechanism 8 is fixed with the blisk workpiece 2 through a fixture base 9. The first lifting mechanism 7 and the first rotating mechanism 8 are used to drive the blisk workpiece 2 to lift and rotate during electrolysis. In order to prevent the tube electrode 3 from interfering with the fixture base 9 when located at the bottom of the blisk workpiece 2 after primary electrolysis, an accommodating groove used for accommodating the tube electrode 3 is formed in the upper surface of the fixture base 9, thus facilitating the tube electrode 3 to be separated from the blisk workpiece 2.

In the embodiment, the worktable 22 is also provided with a second lifting mechanism 10. The lifting end of the second lifting mechanism 10 is fixed on the top cover plate 4. The second lifting mechanism 10 drives the top cover plate 4 to move up and down, so that the tube electrode 3 is located on the top of the blisk workpiece 2, and then the top cover plate 4 is lowered to be pressed against the top of the blisk workpiece 2.

Specifically, in the embodiment, the first lifting mechanism 7 can be a lead screw. The second lifting mechanism 10 can be a telescopic oil cylinder. The top cover plate 4 is fixed at the end of the piston rod of the telescopic oil cylinder. The first rotating mechanism 8 can be a conventional rotary device for which the embodiment is not specifically limited. At the same time, it should be understood by those skilled in the art that in the embodiment, the worktable 22 is also provided with auxiliary equipment used for fixing the first lifting mechanism 7, the second lifting mechanism 10 and the first rotating mechanism 8, such as a fixed support.

In the embodiment, an outer ring rotating ring 11 sleeves the outer part of the electrolytic bath 11. The outer ring rotating ring 11 is connected with a second rotating mechanism which drives the outer ring rotating ring 11 to rotate. A first electrode support 13 and a second electrode support 14 can be rotationally arranged on the outer ring rotating ring 11 and the electrolytic bath 1, respectively. An electrolyte outlet pipe 24 can slide along axial direction of the pipe and penetrate through the first electrode support 13. The tube electrode 3 is arranged on the second electrode support 14 and communicates with the electrolyte outlet pipe 24. The second electrode support 14 can be of a hollow structure and communicates with the tube electrode 3. At the same time, the end of the electrolyte outlet pipe 24 communicates with the second electrode support 14, and at least the part, matched with the first electrode support 13 and the second electrode support 14, of the electrolyte outlet pipe 24 is of a rigid structure, so as to ensure that the electrolyte outlet pipe 24, the first electrode support 13 and the second electrode support 14 can rotate at the same time and drive the tube electrode 3 to deflect. Furthermore, the second rotating mechanism can drive the outer ring rotating ring 11 to rotate. During the rotating process of the outer ring rotating ring 11, the tube electrode 3 can deflect, which can facilitate the first lifting mechanism 7 to lower the blisk workpiece 2 and the fixture base 9 into the electrolytic bath 1 at the initial stage of machining. The tube electrode 3 also deflect during the electrolysis process. While the blisk workpiece 2 rotates and rises, the tube electrode 3 can relatively move along the blade profile of the finished blisk workpiece 2. The rotation and rise of the blisk workpiece 2 and the deflection of the tube electrode 3 need to be controlled by a control system, and the control system can be obtained by those skilled in the art.

In order to drive the outer ring rotating ring 11 to rotate, in the embodiment, gear teeth 23 are arranged on the outer wall of the outer ring rotating ring 11. The second rotating mechanism includes a gear 121 meshed with the gear teeth 23 and a servo motor 122 which is fixed on the worktable 22 and in transmission connection with the gear 121. The blisk workpiece 2 and the tube electrode 3 do not need to rotate at too large angles for machining a blade profile in the electrolysis process. Therefore, in the embodiment, the gear teeth 23 in a certain angle range, instead of the whole circle of gear teeth 23, can be arranged on the outer ring rotating ring 11 on the outer edge.

At the same time, in the embodiment, a plurality of tube electrodes 3 are arranged along the circumferential direction of the electrolytic bath 1. Correspondingly, a plurality of electrolysis chambers 5, a plurality of first electrode supports 13 and a plurality of second electrode supports 14 are also arranged. The first electrode support 13 and the second electrode support 14 are both of insulation structures. Through the rotation of the outer ring rotating ring 11, the tube electrodes 3 can be driven to deflect at the same time, so that a plurality of cascade channels can be completed by one-time electrochemical machining, and the machining efficiency is higher.

Further, in the embodiment, the electrolyte outlet pipes 3 communicate with an electrolyte storage tank 15 used for storing the electrolyte through an electrolyte shunt device 18. An electrolyte inlet valve 19 is arranged between the electrolyte shunt device 18 and the electrolyte storage tank 15. A drainage pipe 16 is arranged at the bottom of the electrolytic bath 1, and an overflow pipe 17 is also arranged inside the electrolytic bath 1. The overflow pipe 17 is used for preventing electrolyte from overflowing from the electrolytic bath 1. The drainage pipe 16 and the overflow pipe 17 both communicate with the electrolyte storage tank 15, and a drainage valve 20 is arranged between the drainage pipe 16 and the electrolyte storage tank 15.

Embodiment II

The embodiment provides a multi-channel electrochemical machining method for a blisk, including the following steps:

firstly, mounting the blisk workpiece 2 and the fixture base 9 on the first rotating mechanism 8;

secondly, enabling the servo motor 122 to rotate, and driving the outer ring rotating ring 11 to rotate by the gear 121, so that the tube electrode 3 is located in the gap between the blisk workpiece 2 and the side wall of the electrolytic bath 1, and the descending path of the blisk workpiece 2 is avoided;

thirdly, driving the blisk workpiece 2 to descend by the first lifting mechanism 7, when the upper surface of the blisk workpiece 2 descends below the tube electrode 3, enabling the first lifting mechanism 7 to stop descending and the servo motor 122 to reverse, so that the tube electrode 3 is located above the blisk workpiece 2;

fourthly, driving the blisk workpiece 2 to ascend by the first lifting mechanism 7, so that the blisk workpiece 2 stops after making contact with the tube electrode 3, and then driving the blisk workpiece 2 to descend at a set distance by the first lifting mechanism 7, so that the a certain initial distance is formed between the tube electrode 3 and the blisk workpiece 2, and the initial distance is generally in the range of 0.5 mm to 1 mm;

fifthly, driving the top cover plate to 4 descend by the second lifting mechanism 10, so that the bottom of the top cover plate 4 is in contact with the top of the blisk workpiece 2, and the tube electrode 3 is correspondingly located in the strip groove;

sixthly, opening the electrolyte inlet valve 19 between the electrolyte shunt device 18 and the electrolyte storage tank 15 to start electrolyte incoming, so that the blisk workpiece 2 and the top cover plate 4 are immersed with the electrolyte;

seventhly, after electrolyte incoming is completed, enabling the blisk workpiece 2 and the electrolyte outlet pipe 24 to be connected with the positive electrode and negative electrode of the power supply 21, while the first lifting mechanism 7 drives the blisk workpiece 2 to ascend, driving the blisk workpiece 2 to rotate by the first rotating mechanism 8, and driving the outer ring rotating ring 11 to rotate by the second rotating mechanism until a group of cascade channels are completed;

eighthly, reversing the first lifting mechanism 7, the first rotating mechanism 8 and the second rotating mechanism, so that the electrolyte outlet pipe 24 returns to the upper part of the blisk workpiece 2, then rotating the blisk workpiece 2, and repeating the above steps to complete all the cascade passages; and ninthly, when all the cascade channels are machined, opening the drainage valve 20, and enabling the electrolyte in the electrolytic bath 1 to flow back to the electrolyte storage tank 15 from the drainage pipe 16.

Adaptive changes made according to actual requirements are all within the protection range of the present disclosure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded as limitation to the involved claims.

What is claimed is:

1. A multi-channel electrochemical machining device for a blisk, comprising an electrolytic bath used for accommodating an electrolyte, a blisk workpiece, a tube electrode and a top cover plate, wherein the blisk workpiece is connected to the positive electrode of a power supply, and the tube electrode is connected to the negative electrode of the power supply; the blisk workpiece, the tube electrode and the top cover plate are all located in the electrolytic bath, the top cover plate is located above the blisk workpiece, a strip groove is formed in the bottom of the top cover plate, an electrolysis chamber used for the tube electrode to electrolyze the blisk workpiece is formed between the strip groove and the surface of the blisk workpiece, in the radial direction of the blisk workpiece, the electrolysis chamber communicates with the electrolytic bath, a drainage seam communicating the electrolysis chamber and the electrolytic bath along the axial direction of the blisk workpiece is formed in the upper surface of the top cover plate, an electrolyte outlet is formed in the tube wall of the tube electrode, and the tube electrode can move along the blade profile of the finished blisk relative to the blisk workpiece.

2. The multi-channel electrochemical machining device for a blisk according to claim 1, wherein the electrochemical machining device also comprises a worktable, the worktable is provided with a first lifting mechanism, the lifting end of the first lifting mechanism is fixedly provided with a first rotating mechanism, and the bottom of the rotating shaft of the first rotating mechanism is fixed with the blisk workpiece.

3. The multi-channel electrochemical machining device for a blisk according to claim 2, wherein the blisk workpiece is fixed on the rotating shaft of the first rotating mechanism through a fixture base, the fixture base is located at the bottom of the blisk workpiece, and an accommodating groove used for accommodating the tube electrode is formed in the upper surface of the fixture base along the radial direction.

4. The multi-channel electrochemical machining device for a blisk according to claim 3, wherein the worktable is also provided with a second lifting mechanism, and the lifting end of the second lifting mechanism is fixed on the top cover plate.

5. The multi-channel electrochemical machining device for a blisk according to claim 4, wherein an outer ring rotating ring sleeves the outer part of the electrolytic bath, the outer ring rotating ring is connected with a second rotating mechanism which drives the outer ring rotating ring to rotate, a first electrode support and a second electrode support can be rotationally arranged on the outer ring rotating ring and the electrolytic bath, respectively, an electrolyte outlet pipe can slide along axial direction of the pipe and penetrate through the first electrode support, and the tube electrode is arranged on the second electrode support and communicates with the electrolyte outlet pipe.

6. The multi-channel electrochemical machining device for a blisk according to claim 5, wherein gear teeth are arranged on the outer wall of the outer ring rotating ring, and the second rotating mechanism comprises a gear meshed with the gear teeth and a servo motor which is fixed on the worktable and in transmission connection with the gear.

7. The multi-channel electrochemical machining device for a blisk according to claim 5, wherein the first electrode support and the second electrode support are both of insulation structures.

8. The multi-channel electrochemical machining device for a blisk according to claim 6, wherein a plurality of tube electrodes are arranged along the circumferential direction of the electrolytic bath, and a plurality of electrolyte outlet pipes communicate with an electrolyte storage tank used for storing the electrolyte through an electrolyte shunt device.

9. The multi-channel electrochemical machining device for a blisk according to claim 8, wherein a drainage pipe is arranged at the bottom of the electrolytic bath, an overflow pipe is also arranged inside the electrolytic bath, and the drainage pipe and the overflow pipe both communicate with the electrolyte storage tank.

10. A multi-channel electrochemical machining method for a blisk implemented by the multi-channel electrochemical machining device for a blisk according to claim 9, comprising the following steps:

firstly, mounting the blisk workpiece and the fixture base on the first rotating mechanism;

secondly, enabling the servo motor to rotate, and driving the outer ring rotating ring to rotate by the gear, so that the tube electrode is located in the gap between the blisk workpiece and the side wall of the electrolytic bath;

thirdly, driving the blisk workpiece to descend by the first lifting mechanism, when the upper surface of the blisk workpiece descends below the tube electrode, enabling the first lifting mechanism to stop descending and the servo motor to reverse, so that the tube electrode is located above the blisk workpiece;

fourthly, driving the blisk workpiece to ascend by the first lifting mechanism, so that the blisk workpiece stops after making contact with the tube electrode, and then driving the blisk workpiece to descend at a set distance by the first lifting mechanism;

fifthly, driving the top cover plate to descend by the second lifting mechanism so that the bottom of the top cover plate is in contact with the top of the blisk workpiece, and the tube electrode is correspondingly located in the strip groove;

sixthly, opening an electrolyte inlet valve between the electrolyte shunt device and the electrolyte storage tank to start electrolyte incoming;

seventhly, after electrolyte incoming is completed, enabling the blisk workpiece and the electrolyte outlet pipe to be connected with the positive electrode and negative electrode of the power supply, while the first lifting mechanism drives the blisk workpiece to ascend, driving the blisk workpiece to rotate by the first rotating mechanism, and driving the outer ring rotating ring to rotate by the second rotating mechanism until a group of cascade channels are completed; and eighthly, reversing the first lifting mechanism, the first rotating mechanism and the second rotating mechanism, so that the electrolyte outlet pipe returns to the upper part of the blisk workpiece, then rotating the blisk workpiece, and repeating the above steps to complete all the cascade passages.

\* \* \* \* \*